C. W. BEAUFORT.
COUPLING.
APPLICATION FILED SEPT. 1, 1914.

1,138,072.

Patented May 4, 1915.

Witnesses
C. N. Walker.
M. Rogers.

Inventor
Charles W. Beaufort
by Geo. E. Tew
Attorney

UNITED STATES PATENT OFFICE.

CHARLES W. BEAUFORT, OF AUGUSTA, GEORGIA.

COUPLING.

1,138,072. Specification of Letters Patent. Patented May 4, 1915.

Application filed September 1, 1914. Serial No. 859,689.

*To all whom it may concern:*

Be it known that I, CHARLES W. BEAUFORT, a citizen of the United States, residing at Augusta, in the county of Richmond and State of Georgia, have invented certain new and useful Improvements in Couplings, of which the following is a specification.

In my pending application Serial Number 848,517 filed July 1, 1914, there is disclosed a flexible coupling or universal joint particularly adapted and intended for use in connection with hydraulic giants or other high pressure water pipes.

The present invention is an improvement on the coupling shown in said application, with respect particularly to the bearings between the two parts of the coupling which permit movement on one axis of the universal joint, and the present invention provides means for adjusting the bearings, which are of the roller type, to take up wear, or according to other conditions.

Figure 1:
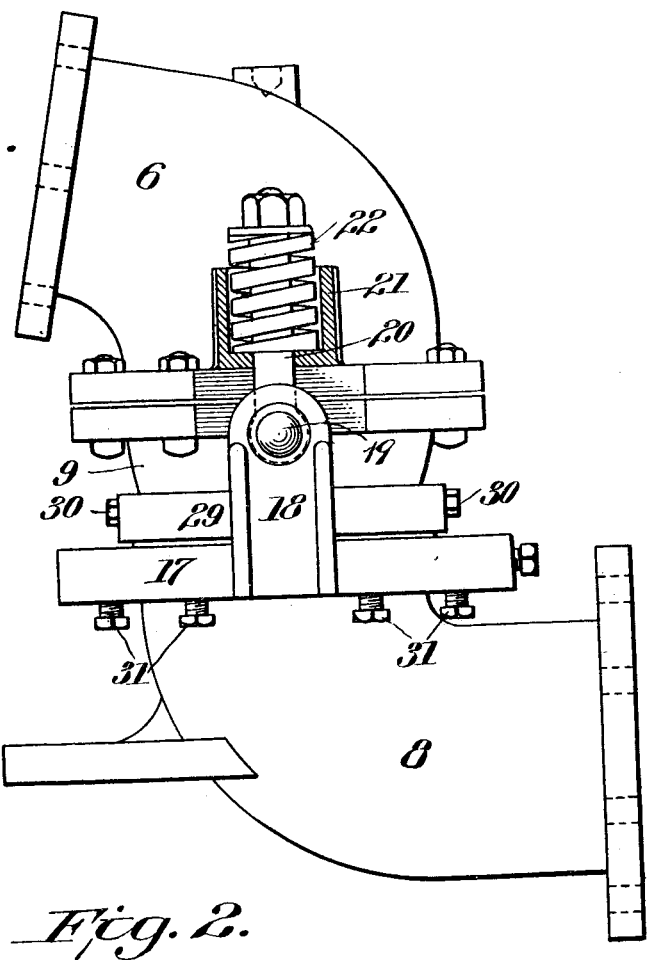
Figure 2:
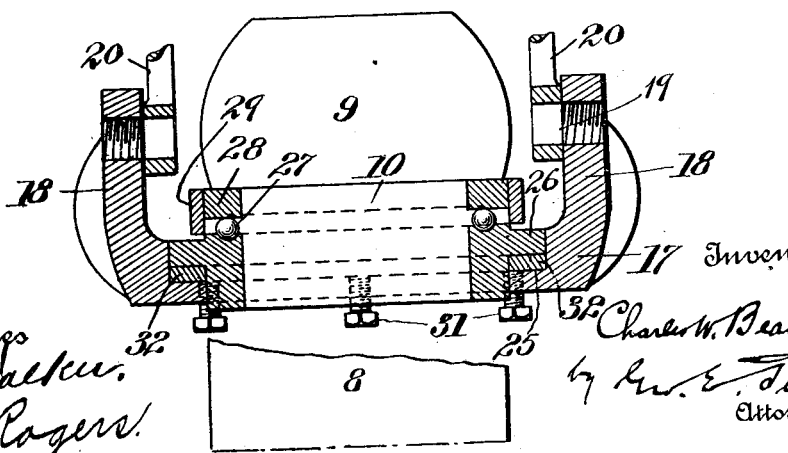

In the accompanying drawings:—Figure 1 is a side elevation, partly in section, of the improved coupling. Fig. 2 is a sectional view, partly broken away, and showing the ball member and the adjustable bearing.

The construction of the coupling is more particularly described in said application, but the main parts are as follows:—6 is the socket member into which the ball member 9 fits, and this member 9 has a reduced neck 10 connected to the lower elbow or pipe member 8. In use with a hydraulic gun the socket member 6 will be connected to the nozzle, and the member 8 to the supply pipe. A yoke 17 fits over the neck of the ball member and has two opposite arms 18 projecting up beside the joint which are connected by pivots 19 and links 20 to lugs 21 on the socket member 6, with springs 22 which press the ball and socket members together with a yielding pressure and which take up wear therebetween. The ring part of the yoke 17 has a shoulder 25 above which is a ring 26 with a ball race in the top thereof to hold bearings 27, the upper part of the bearing being formed by a ring 28 engaging under the ball 9, and the balls being held by a retainer band 29 fastened to the upper ring by screws 30. The rings 26 and 28 are made in halves so that they can be put on the neck. All of the above are substantially described in my pending application.

In order to provide means for adjusting the ball bearings, the ring 17 is tapped at various places around the same to receive screws 31, the inner ends of which bear against a packing plate or ring 32, which fits in a shouldered recess in the under side of the race ring 26 which as stated forms one bearing for the balls.

By means of the screws 31, it is possible to set up or adjust the ring 26 with respect to the bearing in order to properly position the same and to take up wear as it occurs, the adjustment being particularly desirable to take up any looseness between the parts which would be especially objectionable in couplings subjected to high pressure, and at the same time the adjustment enables the bearings to be set loose enough to permit the coupling to be turned when desired. Furthermore, the adjustment of the bearing regulates the relative position of the yoke 17, and enables the pivots 19 to be set exactly in line with the center of the ball 9, which is necessary to make a perfect contact between the ball and socket in all positions thereof.

The invention is not limited to the use of set screws in the relation described and illustrated, since other devices may be used to adjust the bearing ring for the purposes as indicated.

I claim:—

1. The combination of ball and socket pipe members fitting together, a yoke pivotally connected between said members, a bearing between said yoke and one of said members, and means to adjust the yoke relative to the bearing, to center the pivots with respect to the ball.

2. The combination of ball and socket pipe members fitting together, the ball member having a reduced neck behind the ball, a connecting yoke between said members, including a ring surrounding said neck, a roller bearing between said ring and ball member, and means to adjust said ring with respect to the bearing.

3. The combination of ball and socket pipe members fitting together, a connecting yoke between said members, pivotal connections between the yoke and one of said members, in line with the center of the ball, and a bearing between the yoke and the other member, the yoke being adjustable with respect to the bearing, to set the pivotal axis in proper alinement with said center.

4. The combination of ball and socket pipe members fitting together, a yoke pivotally connected to one of said members, and a bearing between the yoke and the other member, said bearing including a ring, and means between the ring and the yoke to adjust the yoke to vary its position relative to the ring.

5. The combination of ball and socket pipe members fitting together, a yoke pivotally connected to one of said members, said yoke including a ring around the other member, a bearing between said ring and said other member, including a bearing ring, and adjusting screws between the yoke ring and the bearing ring.

In testimony whereof, I affix my signature in presence of two witnesses.

CHARLES W. BEAUFORT.

Witnesses:
J. H. WISE,
JAS. BROTHERTON.

Copies of this patent may be obtained for five cents each, by addressing the "Commissioner of Patents, Washington, D. C."